United States Patent
Teller et al.

(10) Patent No.: US 8,996,024 B1
(45) Date of Patent: Mar. 31, 2015

(54) VIRTUAL POOLING OF LOCAL RESOURCES IN A BALLOON NETWORK

(75) Inventors: Eric Teller, San Francisco, CA (US); Richard Wayne DeVaul, Mountain View, CA (US); Clifford L. Biffle, Berkeley, CA (US); Josh Weaver, San Jose, CA (US)

(73) Assignee: Google Inc., Mountain View, CA (US)

( * ) Notice: Subject to any disclaimer, the term of this patent is extended or adjusted under 35 U.S.C. 154(b) by 366 days.

(21) Appl. No.: 13/555,299

(22) Filed: Jul. 23, 2012

(51) Int. Cl.
*H04W 72/00* (2009.01)
*H04W 72/04* (2009.01)
*H04W 16/24* (2009.01)

(52) U.S. Cl.
CPC ..................................... *H04W 16/24* (2013.01)
USPC ...................... 455/452.1; 455/456.3; 455/509; 455/67.11

(58) Field of Classification Search
USPC .......... 455/452.1, 456.1, 456.3, 456.6, 422.1, 455/69, 452.2, 509, 67.11; 700/99, 100
See application file for complete search history.

(56) References Cited

U.S. PATENT DOCUMENTS

| 6,167,263 | A | 12/2000 | Campbell |
| 6,959,225 | B1 * | 10/2005 | Logsdon et al. ............... 700/100 |
| 7,567,779 | B2 | 7/2009 | Seligsohn et al. |
| 7,725,207 | B1 * | 5/2010 | Logsdon et al. ................ 700/99 |
| 2013/0084878 | A1 * | 4/2013 | Chen et al. .................. 455/452.1 |
| 2013/0331114 | A1 * | 12/2013 | Gormley et al. ........... 455/452.1 |

FOREIGN PATENT DOCUMENTS

| WO | 9504407 | 2/1995 |
| WO | 0159961 | 8/2001 |

\* cited by examiner

*Primary Examiner* — John J Lee
(74) *Attorney, Agent, or Firm* — McDonnell Boehnen Hulbert & Berghoff LLP

(57) ABSTRACT

Disclosed embodiments relate to virtual pooling of a local resource in a balloon network. In an example, a balloon network has geographic zones, including at least a first and a second geographic zone. Further, each balloon has a sustainable utilization rate for a local resource. Each balloon utilizes the local resource according to a respective first utilization rate when located in the first geographic zone and utilizes the local resource according to a second utilization rate when located in the second geographic zone. For one or more of the balloons, the sustainable utilization rate is less than the respective first utilization rate and greater than the respective second utilization rate. However, the balloons are operable to move between the geographic zones such that the first utilization rate is substantially continuous in first geographic zone.

20 Claims, 7 Drawing Sheets

VIRTUAL POOLING OF LOCAL RESOURCES IN A BALLOON NETWORK

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a system includes a plurality of balloons that operate as nodes in a balloon network, wherein the balloon network comprises a plurality of geographic zones, and wherein the geographic zones comprise at least a first and a second geographic zone. Each of the balloons has a sustainable utilization rate for a local resource. Further, each balloon utilizes the local resource according to a respective first utilization rate when located in the first geographic zone and utilizes the local resource according to a second utilization rate when located in the second geographic zone, and wherein, for one or more of the balloons, the sustainable utilization rate is less than the respective first utilization rate and greater than the respective second utilization rate. The plurality of balloons is operable to move between the geographic zones of the balloon network such that the first utilization rate is substantially continuous in first geographic zone.

In another aspect, a balloon system includes a network interface operable to facilitate communication between a balloon and one or more other nodes in a balloon network, wherein the balloon network comprises a plurality of geographic zones, and wherein a utilization rate for a local resource is defined for each geographic zone. The balloon system further includes a non-transitory computer readable medium and program instructions stored on the non-transitory computer readable medium. The program instructions are executable by at least one processor to: (a) while the balloon operates in a first geographic zone, cause the balloon to utilize the local resource according to the defined utilization rate for the first geographic zone, wherein the balloon has a pre-defined sustainable utilization rate for the local resource, and wherein the defined utilization rate for the first geographic zone is greater than the sustainable utilization rate; and (b) determine a path of movement through a plurality of the geographic zones, wherein the path is such that over-utilization of the local resource while the balloon is located in the first geographic zone is substantially offset by under-utilization of the local resource while the balloon is located in one or more of the geographic zones.

In a further aspect, a system includes a plurality of balloons that operate as nodes in a balloon network, wherein the balloon network comprises a plurality of geographic zones, wherein each of the balloons has a sustainable utilization rate for a local resource, and wherein an operating utilization rate of each balloon is an actual rate at which the balloon is utilizing the local resource at a given point in time. Each balloon is configured to adjust its respective operating utilization rates such that, at a given point in time, a combined utilization rate for the local resource in a first geographic zone is substantially equal to a first predefined combined utilization rate, wherein the first predefined combined utilization rate is greater than the combined sustainable utilization rate in the first geographic zone. Further, the plurality balloons are further operable to adjust their respective operating utilization rates such that, at a given point in time, a combined utilization rate for the local resource in a second geographic zone is substantially equal to a second predefined combined utilization rate, wherein the second predefined combined utilization rate is greater than a combined sustainable utilization rate in the second geographic zone. The plurality of balloons is further operable to move between the geographic zones of the balloon network such that the first predefined combined utilization rate is substantially continuous in first geographic zone.

These as well as other aspects, advantages, and alternatives, will become apparent to those of ordinary skill in the art by reading the following detailed description, with reference where appropriate to the accompanying drawings.

DETAILED DESCRIPTION

Figure 1:
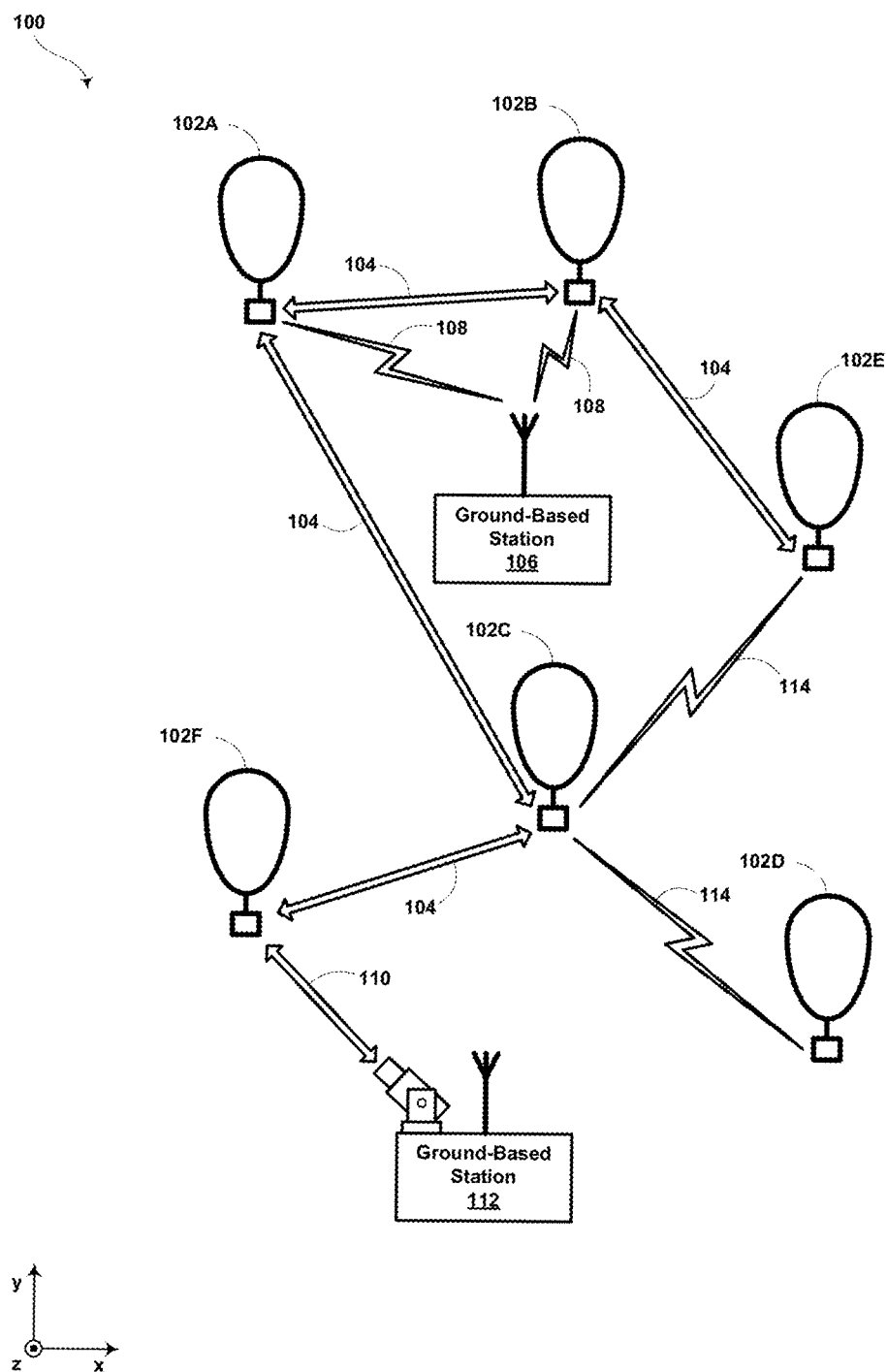
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments may be implemented in a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

In an exemplary balloon network, balloons may move latitudinally and/or longitudinally relative to one another so as to form a desired topology. However, keeping an individual balloon at a specific location may be difficult due to winds, and possibly for other reasons as well. Accordingly, the desired topology may define a relative framework and/or rules for positioning of balloons relative to one another, such that balloons can move with respect to the ground, while maintaining the desired topology. Thus, at a given location on earth, the particular balloon or balloons that provide service may change over time.

In the context of balloons moving around geographically in a balloon network, it may be desirable to provide services and features that, from the perspective of the end user, appear to be substantially the same as in an access network where access points remain stationary. Further, it may be desirable to devote more network resources to some geographic areas in a network than to others. For instance, it may be desirable to provide and maintain a higher average quality of service in some areas than in others. Similarly, it may be desirable to provide consistent service to more end-user devices in some areas than in others.

A "local resource" may be a resource that is individual to each balloon and cannot typically be transferred between balloons, such as the amount of power available from a given balloon's power system. The amount of certain local resources may impact the quality of service, available bandwidth, and/or the number of end-user that can be served in a given area. For instance, a balloon may increase its quality of service and/or support more end-user connections by increasing the power utilized for data transmissions.

However, the amount of local resources at a given balloon may be limited. For example, balloons typically have limited power available. Even when a balloon is configured to generate its own power (e.g., using solar panels), the balloon may consume power at a faster rate than it generates power, and eventually run out of power. Accordingly, a balloon may have a sustainable utilization rate for power (and for other local resources). The sustainable utilization rate for a local resource may be defined as a maximum utilization rate at which the balloon will not run out of power (either indefinitely, or over period of time).

In some instances, it may be desirable to increase the utilization of local resources beyond the sustainable utilization rate. To do so, local resources may be increased in certain geographic area by increasing network infrastructure in the area; e.g., by increasing the number of balloons operating in the area. However, increasing a given balloon's utilization rate beyond its sustainable utilization rate could cause the balloon to run out of power before desired. Further, the topology of the balloon network may be influenced by a number of other factors, such as efficiently using available wind patterns to move, positioning balloons such that meeting future service needs is possible, and meeting the varying service requirements over a large number of areas with differing needs, among other possibilities. As such, there may be situations where increasing the number of balloons operating in a certain geographic area is not possible and/or is not desirable.

Accordingly, in an illustrative embodiment, balloons may be operable to virtually pool their local resources, such as by creating a virtual power pool. While a local resource cannot be physically transferred between balloons, the mobility of the balloons allows for virtual pooling via coordinated movements of the balloons.

For example, balloons in a first geographic zone may over-consume power for a period of time, so long as this is balanced by balloons in other geographic zones that under-consume power in a proportional manner. A balloon that has over-consumed may later move out of the first geographic zone and into a zone where the balloon's power consumption rate is lower than the balloon's recharge rate (e.g., the rate at which the balloon can recharge its power supply). At the same time, another balloon, which will typically have more available power, may move into the first geographic zone to take the place of the balloon that moved out of the zone. Thus, a given balloon can over-consume for a period, and then switch positions with the nearby balloon, so that it can under-consume for a period (resulting in an overall power consumption that is sustainable over the long term).

Note that the example of balloons switching places is provided for illustrative purposes. Much more complex coordinated movements, which involve any number of balloons, are also possible. For example, in some embodiments, the balloons may use an energy function to determine how to move in order to provide a desired topology. As such, the power consumption may be taken into account when applying the energy function. Other examples are also possible.

By intelligently moving so as to offset time spent in geographic zones where over-utilization is required with time spent in geographic zones where under-utilization is possible, a balloon can utilize a local resource at above its sustainable utilization rate for a period of time, without the usual risks associated with over-utilization. Further, a number of balloons may coordinate such movements to collectively create a virtual pool of the local resource (e.g., a virtual power pool). To provide such a virtual local-resource pool, geographic zones may be defined in a balloon network where the specified utilization rate of the local resource is above the sustainable utilization rate of the local resource for some or all balloons, and/or where the combined utilization rate of all balloons is above the combined sustainable rate of the balloons. Further, with coordinated movement of balloons into and out of such a geographic zone, the combined utilization rate may be kept above the combined sustainable rate on a substantially continual basis.

2. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modelled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of the invention.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons area distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
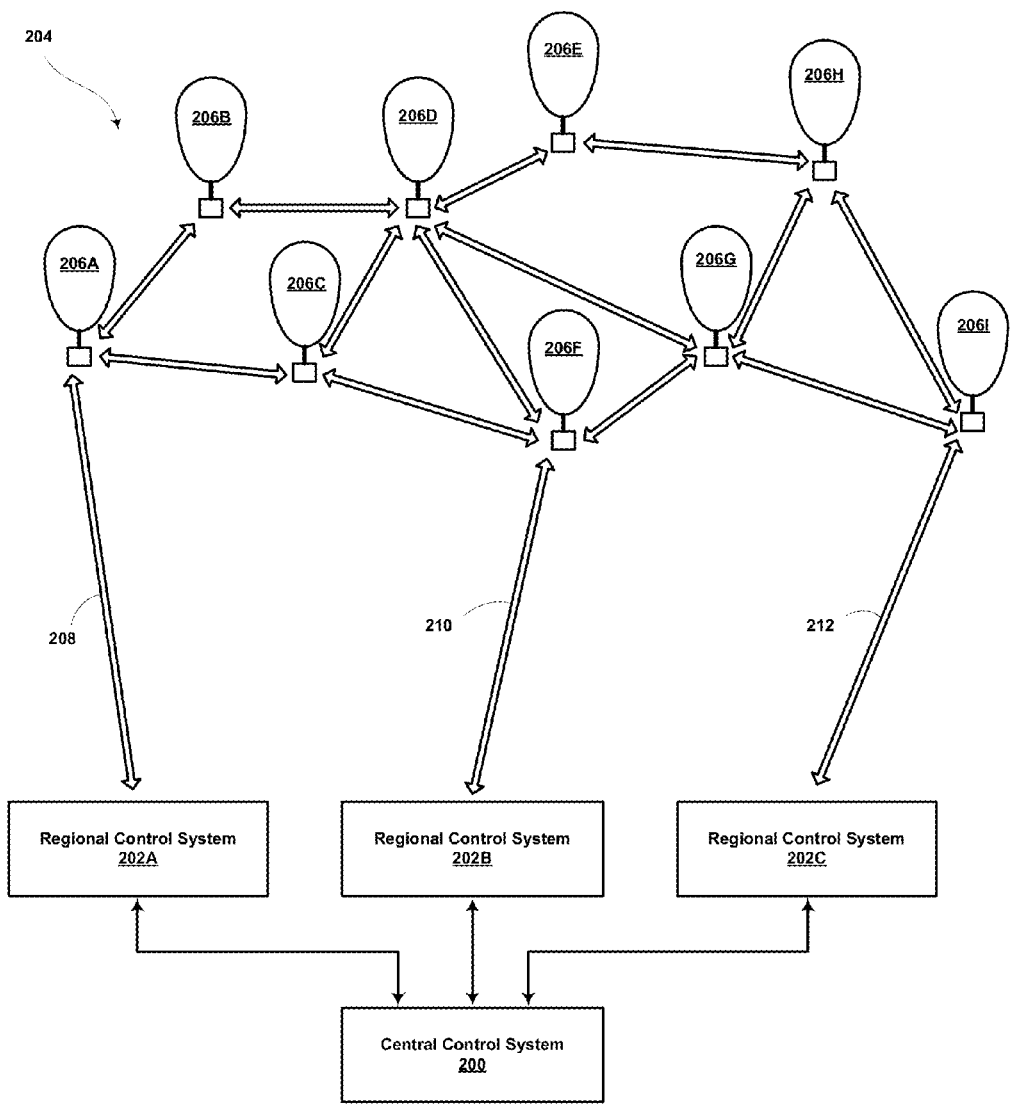
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_f$, wherein $d_f$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
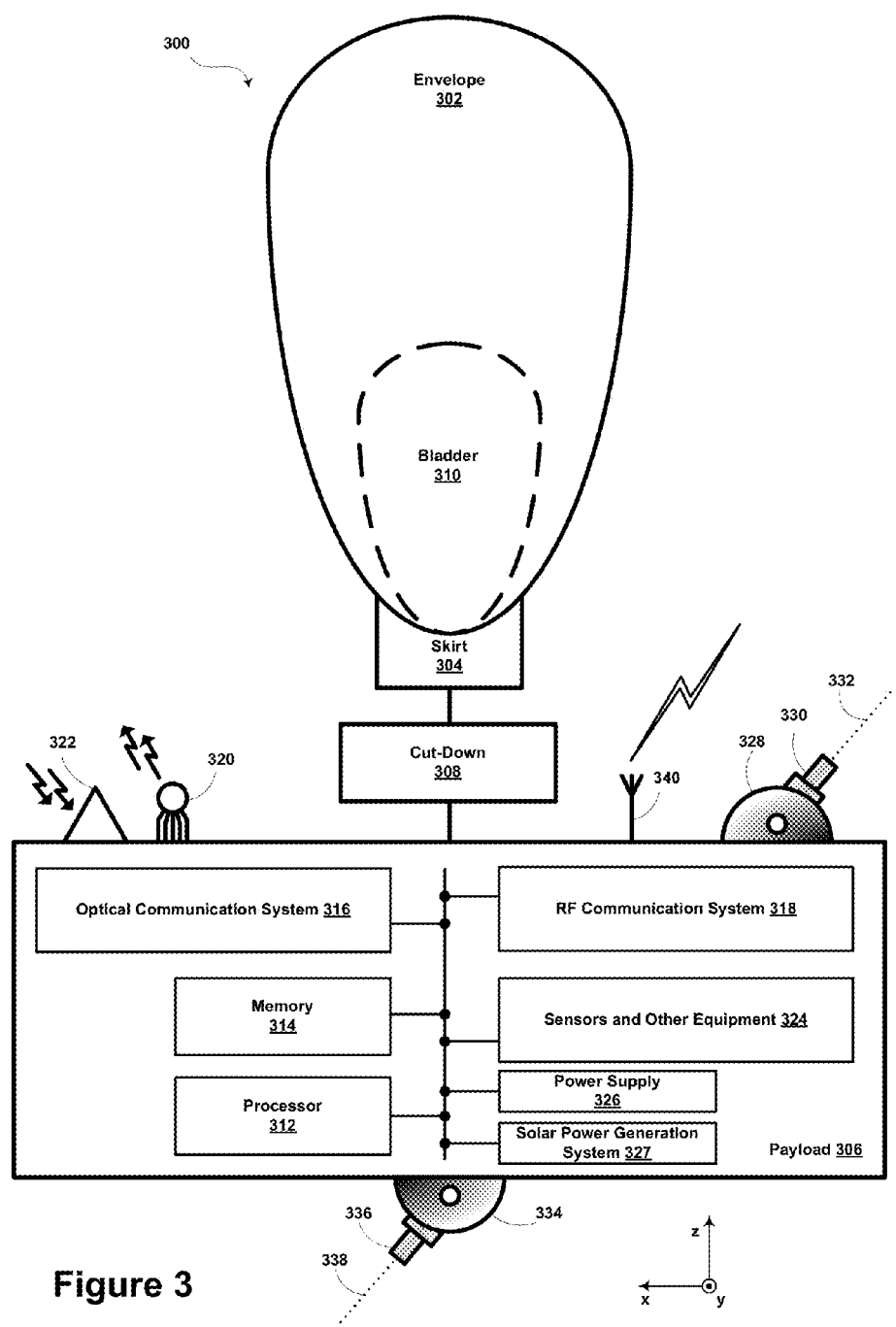
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The optical communication system 316 and/or the RF communication system 318 are examples of communication systems that may include communication interfaces for communications between a balloon and other nodes in a balloon network. It should be understood that other types of communication systems that provide other types of communication interfaces are also possible, and may vary depending upon the particular network implementation.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by power supply 326.

Further, payload 306 may include various types of other systems and sensors 328. For example, payload 306 may include one or more video and/or still cameras, a GPS system, various motion sensors (e.g., accelerometers, magnetometers, gyroscopes, and/or compasses), and/or various sensors for capturing environmental data. Further, some or all of the components within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a ridged bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In other embodiments, in-flight balloons may be serviced by specific service balloons or another type of aerostat or aircraft.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
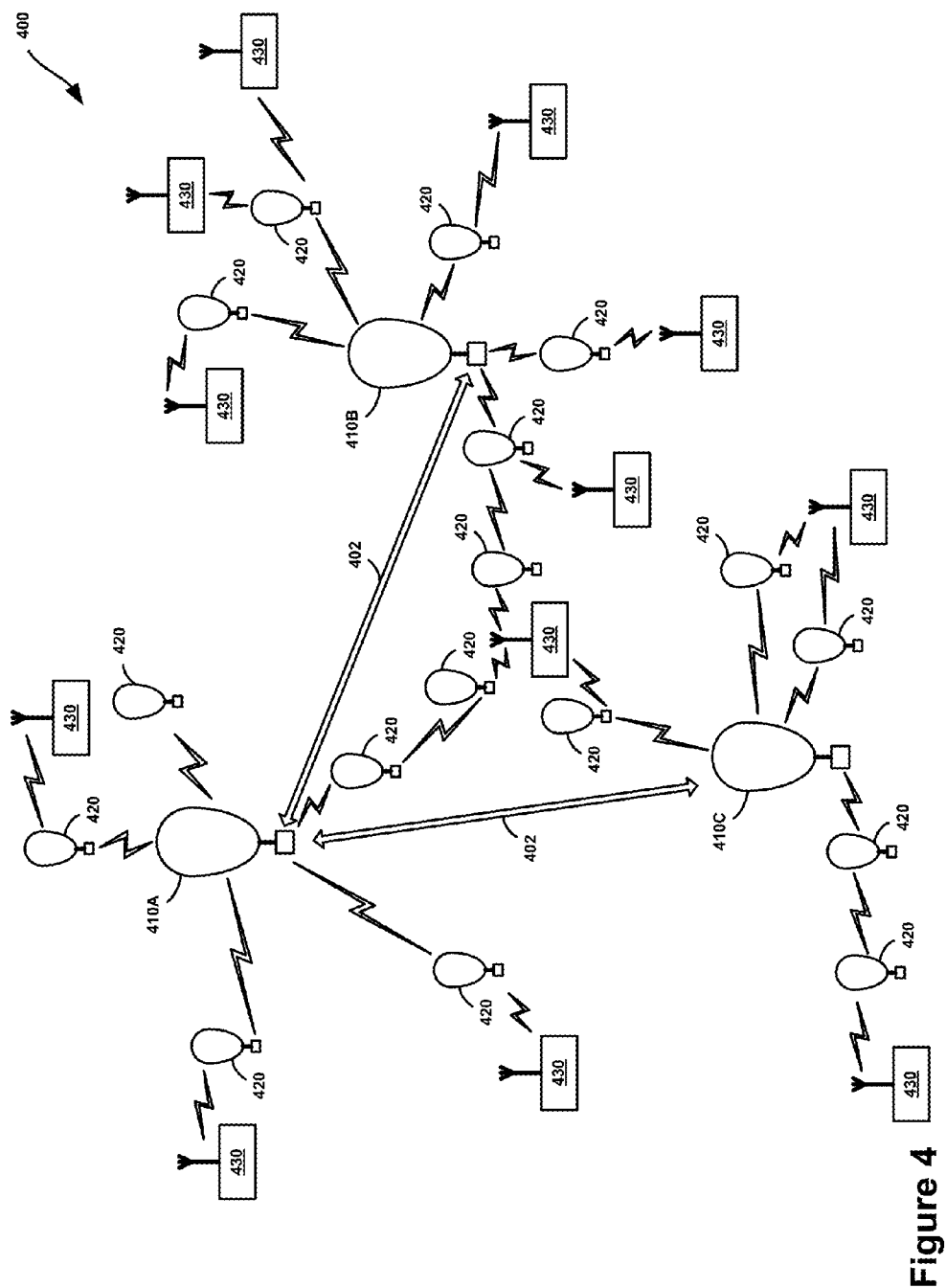
FIG. 4 is a simplified block diagram illustrating a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at speeds of 10 to 50 GB/sec or more.

A larger number of balloons may be configured as sub-nodes, which may communicate with ground-based Internet nodes at speeds on the order of approximately 10 MB/sec. Configured as such, the sub-nodes 420 may be configured to connect the super-nodes 410 to other networks and/or to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. Examples of Virtual Local-Resource Pooling

A system according to an example embodiment may include a heterogeneous or homogenous group of balloons, such as the balloons illustrated in FIGS. 1 to 3, which are configured to operate as nodes in a balloon network that includes a number of defined geographic zones. In some embodiments, each geographic zone may define a utilization rate for a given local resource, which may be assigned to balloons that operate in the particular geographic zone. Each balloon may then vary its utilization rate for the local resource in accordance with the defined utilization rate for the particular geographic zone in which the balloon is located at a given point in time.

4a) Virtual Local-Resource Pooling with a Per-Balloon Utilization Rate

Herein, a "defined" utilization rate should be understood to be the utilization rate that is specified for each balloon that is operating in a particular geographic zone, and accordingly may be assigned to balloons that operate in the particular geographic zone. The actual utilization rate of a given balloon at a given point in time (i.e., the defined utilization rate for the geographic zone in which the balloon is currently located), may be referred to as the balloon's operating utilization rate (which may be the same as the defined utilization rate for the geographic zone in which the balloon is located at a given point in time). Yet further, the sustainable utilization rate may be defined as a maximum utilization rate at which the balloon can continue to operate and not run out of power (either indefinitely, or over period of time).

For simplicity, examples provided herein may assume that the sustainable utilization rate for a local resource is the same for all balloons. However, it should be understood that a group of balloons can include balloons with different sustainable utilization rates for the same local resource, without departing from the scope of the invention. Further, for illustrative purposes, examples herein may assume that a given balloon's sustainable utilization rate does not change over time. However, it should be understood that a given balloon's sustainable utilization rate may change over time. For example, a balloon's sustainable utilization rate may decrease over time if the maximum capacity of a balloon's rechargeable power source decreases over time and/or may change for other reasons.

To illustrate the relationship between a sustainable utilization rate for power and a balloon's ability to recharge its battery during the day, consider an example balloon that, during an average day, is capable of generating 200 watts that can be used to recharge its battery. Further, the balloon may have 0.4 kWh to 1 kWh battery. Additionally, the example balloon may have a power budget of 0.03 to 0.05 kWh to, e.g., keep itself warm, perform station keeping via altitude control, operate its various communication systems, and so on. Thus, under normal conditions, the example balloon may be able to fully charge its battery during each day (assuming a typical 8 to 16 hours of sun exposure), and then make it through the night on a fully charged battery.

In some embodiments, the defined utilization rate for a local resource in one or more geographic zones may be greater than a given balloon's sustainable utilization rate for the same local resource. Additionally, in one or more other geographic zones, the defined utilization rate for the same local resource may be less than the given balloon's sustainable utilization rate. As such, the balloon may offset over-utilization of the local resource that occurs while the balloon is located in a geographic zone where the defined utilization rate is greater than its sustainable utilization rate, with under-utilization while located in the geographic zone where the defined utilization rate is less than the balloon's sustainable utilization rate.

Further, in an example system, a number of balloons are each operable to move between the geographic zones of the balloon network such that the respectively defined utilization rates in the geographic zones can be maintained on a substantially continuous basis. Herein, the concept of a utilization rate being substantially continuous in a given geographic zone should be understood to mean that balloons update their operating utilization rate such that whichever balloons are in the geographic zone at a given point in time each have an operating utilization rate that is substantially equal to the defined utilization rate for the geographic zone. Thus, as balloons rotate in and out of the geographic zone where the defined utilization rate is greater than the balloons' sustainable utilization rate, whichever balloons are operating in the geographic zone at a given point in time will adjust their respective operating utilization rates according to the defined utilization rate for the geographic zone.

Figure 5A:
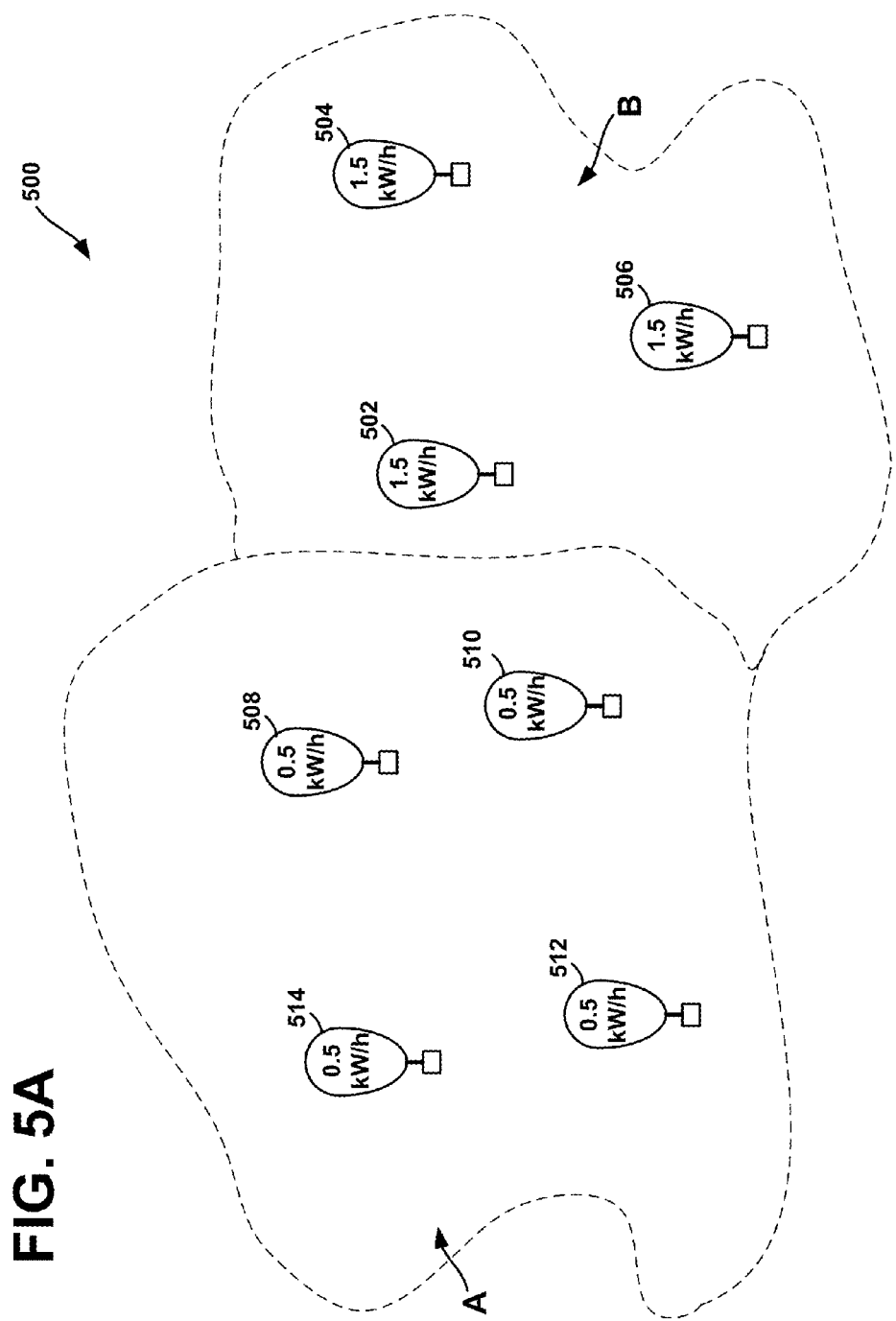
FIG. 5A shows a portion of balloon network in which an example system may be implemented.

FIG. 5A shows a portion of balloon network 500 in which an example system may be implemented. Two geographic zones A and B are shown in the illustrated portion of network 500. As further shown, the example system includes a number of balloons 502 to 514, which are operable as nodes in balloon network 500. In the illustrated scenario, balloons 502 to 506 are located in geographic zone A and balloons 508 to 514 are located in geographic zone B.

With reference to FIG. 5A, an example implementation will now be described in which balloons virtually pool their local power. However, it should be understood that the described features and concepts can also apply to implementations that involve local resources other than power.

In an example implementation, each balloon's sustainable utilization rate for local power may be 1.0 kW/hour. Further, in geographic zone A, the defined utilization rates for power usage in may be 1.5 kW/hour and 0.5 kw/hour in geographic zone A and geographic zone B, respectively. Note that the sustainable utilization rates described in reference to FIGS. 5A and 5B, and in other examples herein, are provided for explanatory purposes, and are not intended to be limiting. It is expected that the sustainable utilization rate or rates of balloons may vary, depending upon the particular implementation. Further, in some implementations, balloons may have separately defined sustainable utilization rates for different time periods during a given day and/or might have a variable sustainable utilization rate that varies over the course of a day (e.g., as a function of the amount of sunlight available).

According to an example embodiment, each balloon utilizes power according to the defined utilization rate for the geographic zone A when located in geographic zone A, and utilizes power according to the defined utilization rate for the geographic zone B when located in geographic zone B. Therefore, when balloons 502 to 514 are located as shown in FIG. 5A, balloons 502 to 506 have an operating utilization rate of 1.5 kW/hour, which is greater than the sustainable utilization rate of 1.0 kW/hour. Further, in the network state shown in FIG. 5A, balloons 508 to 514 have an operating utilization rate of 0.5 kW/hour, which is less than the sustainable utilization rate.

In order to achieve the defined utilization rate of 1.5 kW/hour in geographic zone A on a substantially continuous basis, some or all of balloons 502 to 514 may move throughout network 500, including into and out of geographic zone A and/or geographic zone B (and possibly other geographic zones) such that (1) each balloon offsets over-utilization of power while in geographic zone A with under-utilization of power while in geographic zone B (and/or other geographic zones having a defined utilization rate that is less than the sustainable utilization rate) and (2) there are three balloons operating in geographic zone A at a given point in time.

Figure 5B:
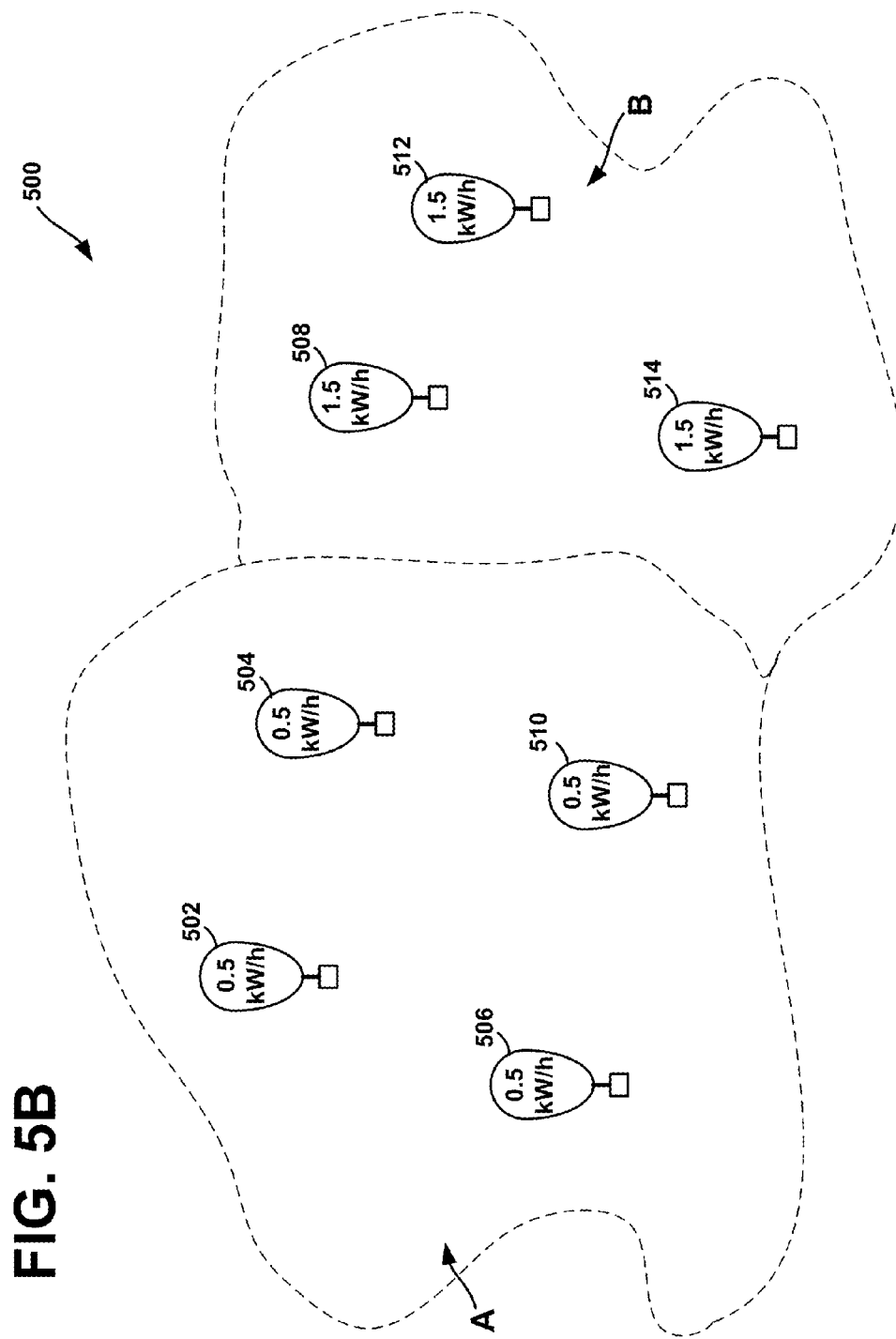
FIG. 5B is illustrates the same portion of the balloon network shown in FIG. 5A at a later point in time.

As an example, FIG. 5B is illustrates the same portion of the balloon network 500 shown in FIG. 5A at a later point in time. More specifically, in the scenario illustrated in FIG. 5B, balloons 508, 512, and 514 have moved out of geographic zone B and in to geographic zone A, while balloons 502 to 506 have all moved out of geographic zone A and in to geographic zone B. As such, balloons 502 to 506, which have depleted their available power due to over-utilization while located in geographic zone A, can now recharge their power source while under-utilizing power in the geographic zone B. Further, since balloons 508, 512, and 514 have moved into geographic zone A, there continue to be three balloons in geographic zone A, which all have a power utilization rate that is above their respective sustainable utilization rate. Further, balloons 502 to 514 may continue to move in this manner so that they are able to avoid depleting their respective local power sources, while at the same time maintaining three balloons in geographic zone A that utilize power at above the sustainable utilization rate.

In some implementations, balloons may increase power utilization in geographic zone in order to increase their respective transmission power. This may in turn allow transmissions from the balloons to provide service to more distant end-user devices, to increase the respective per-user transmission power (in communication protocols where total transmission power is divided amongst end-user devices being served), and/or to serve more end-user devices concurrently, among other possible benefits.

In a further aspect, balloons may increase power utilization and operate at a utilization rate that is greater than the sustainable utilization rate, for reasons other than increasing transmission power. For instance, balloons in a given geographic zone may over-utilize power in order to run various types of equipment and systems of the respective balloons. As a specific example, each balloon in a given geographic zone may increase its power utilization in order to run equipment that measures atmospheric conditions. In such an implementation, balloons may travel in and out of such a geographic zone in a manner that allows for continual measurement of the atmospheric conditions over a period of time that is longer than would be possible without a virtual power pool of an example system.

As another example, each balloon in a given geographic zone may increase its power utilization in order to operate a camera or cameras and capture still images or video of outer space from the geographic zone (e.g., to document movement of stars and/or planetary movement). In such an implementation, balloons may travel in and out of such a geographic zone in a manner that allows for the collective still images and/or video of the balloons to document outer space over a period of time that is longer than would be possible without a virtual power pool of an example system (e.g., because the camera on an individual balloon would run out).

Note that in the above discussion of FIGS. 5A and 5B, there is an additional criterion for the network topology; i.e., a balloon-density parameter that there be three balloons operating in geographic zone A. (Similarly, the balloons my move such that there are four balloons in geographic zone B on a continual basis.) Note that embodiments where geographic zones do not have balloon-density parameters are also possible. Further, the balloon-density parameters may vary over time. For instance, the balloon-density parameter in a given geographic zone may vary according to historical and/or expected bandwidth demand. As one example, different balloon densities may be specified during the day and during the night (e.g., with less balloons and lower balloon density during the night, when bandwidth demand may be lower). As another example, balloon density may be increased for a period of time during which a major sporting event or concert is occurring in a geographic zone in order to meet an expected increase in network usage during the sporting event. Other examples are also possible.

In an example embodiment, geographic zones may be defined by specific geographic coordinates, such as by specific GPS coordinates, for example. However, a geographic zone could also be defined around an object or group of objects (e.g., a building or group of buildings), and/or could be defined in other ways. Further, a moving geographic zone could be defined around, e.g., a moving object or person. For example, a moving geographic zone could be defined around a vehicle capable of changing its location (e.g., cars, trains, cruise ships, etc.). To illustrate, a geographic zone could be defined around and move with a large ocean liner in order to provide high-speed data connectivity to the passengers on the ocean liner as the ocean liner travels across the ocean. As another example, a moving geographic zone could be defined around a certain person or group of people, such that there is continuity in the service provided to the person or group as they move about geographically.

It should be understood that the number of geographic zones and/or the size and shape of each geographic zone can vary from the examples described herein. Further, the number of balloons in each geographic zone may vary, depending upon the implementation. Geographic zones with zero or one balloon are possible as well.

Further, note that the geographic zones in a balloon network may be defined independently from the coverage reach of the balloons in the network. In other words, the geographic zones may be defined in a manner that is not dependent on the individual coverage areas served by balloons in the balloon network. For instance, borders of geographic zones may be defined such that a given zone encompasses an area where there is level of resource demand that differs significantly from an adjacent geographic zone or zones (e.g., a geographic zone defined around a city, which may be adjacent to one or more geographic zones that encompass one or more suburban and/or rural areas).

More generally, geographic zones may be defined based on design considerations. For example, geographic zones may be defined for different areas according to differing power requirements of end users in the zones, differing interference concerns for RF and/or optical signals in the zones, and/or differing types of service desired by end users in the zones, among other possibilities.

In a further aspect, balloons could also maintain location-aware caches of user-data, which each balloon updates according to the respective geographic area in which it is located. As such, balloons that update their state according to location-specific balloon-state profiles may also update their respective location-aware caches as they move in and out of the defined geographic areas, such that whichever balloon or balloons are in a given geographic area can provide the same or a similar cache of user-data, while located in the given geographic area. Thus, while balloons might move between geographic areas, users in a given geographic area may be provided with caching functionality that replicates, or at least comes close to replicating, the caching functions of a fixed access point.

Additionally, a balloon may utilize location-specific balloon-profiles, which may be defined for each geographic zone in a balloon network, to update its operating utilization rate according to the geographic zone in which the balloon is located at a given point in time. Such location-specific balloon-profiles may be defined for a particular geographic zone, and may specify state and/or operational parameters for the geographic zone, such as the defined utilization rate and/or the combined utilization rate for the geographic zone. More generally, parameters specified by a balloon-state-profile for a given geographic zone may include, but are not limited to: (a) a communication protocol or protocols to be used for communications with ground-based stations and/or other balloons in the area, (b) parameters for routing between balloons and ground-based stations in area, (c) transmission power requirements (e.g., minimum and/or maximum transmission power), (d) error correction coding, (e) a desired topology for the portion of the balloon network serving the area, (f) identifying information and/or other information relating to ground-based stations or other fixed systems in the area, which the balloon can connect to (e.g., to connect with other networks), (g) power management of balloon while in the area, (h) parameters affecting the horizontal and/or altitudinal movement of the balloon (e.g., limits on speed, a maximum altitude, and/or a minimum altitude, etc.), and/or (i) parameters required in order to fall within a desired regulatory class set out by the government of the country in which the area is located, or to otherwise comply with legal requirements or regulations in the geographic area. Other parameters are also possible.

4b) Virtual Local-Resource Pooling to Achieve a Combined Utilization Rate

In the embodiments described in reference to FIGS. 5A and 5B, the defined utilization rate for a given zone is described as a per-balloon utilization rate, such that each individual balloon in the given geographic zone operates at the same defined utilization rate for the geographic zone.

In other embodiments, balloons in the same geographic zone may have different utilization rates for the same local resource, while still coordinating their movements so as to provide a virtual power pool.

For example, in a given geographic zone, balloons may individually utilize a local resource such that the sum of the balloons' utilization rates is greater than the sum of the balloons' sustainable utilization rates. More specifically, the sum of the actual (e.g., operating) utilization rates of all individual balloons in a given zone may be referred to as the "combined utilization rate" for the given zone. Accordingly, utilization rates may be assigned to balloons in at least one geographic zone such that the combined utilization rate in the geographic zone is greater than a sum of the sustainable utilization rates of the balloons operating in the geographic zone.

When a combined utilization rate for a given geographic zone is greater than the combined sustainable utilization rate of the balloons operating in the zone, some and possibly all of the balloons in the geographic zone may utilize the local resource at above their respective sustainable utilization rates. Accordingly, utilization rates may be assigned to balloons in at least one other geographic zone such that the combined utilization rate in the other geographic zone is less than the sum of the sustainable utilization rates of the balloons operating in the other geographic zone. As such, balloons may implement a virtual local-resource pool by moving between the geographic zones such that the combined utilization rate is substantially continuous in first geographic zone, and such that individual balloons offset over-utilization in some geographic zones with under-utilization in other geographic zones.

Figure 6:
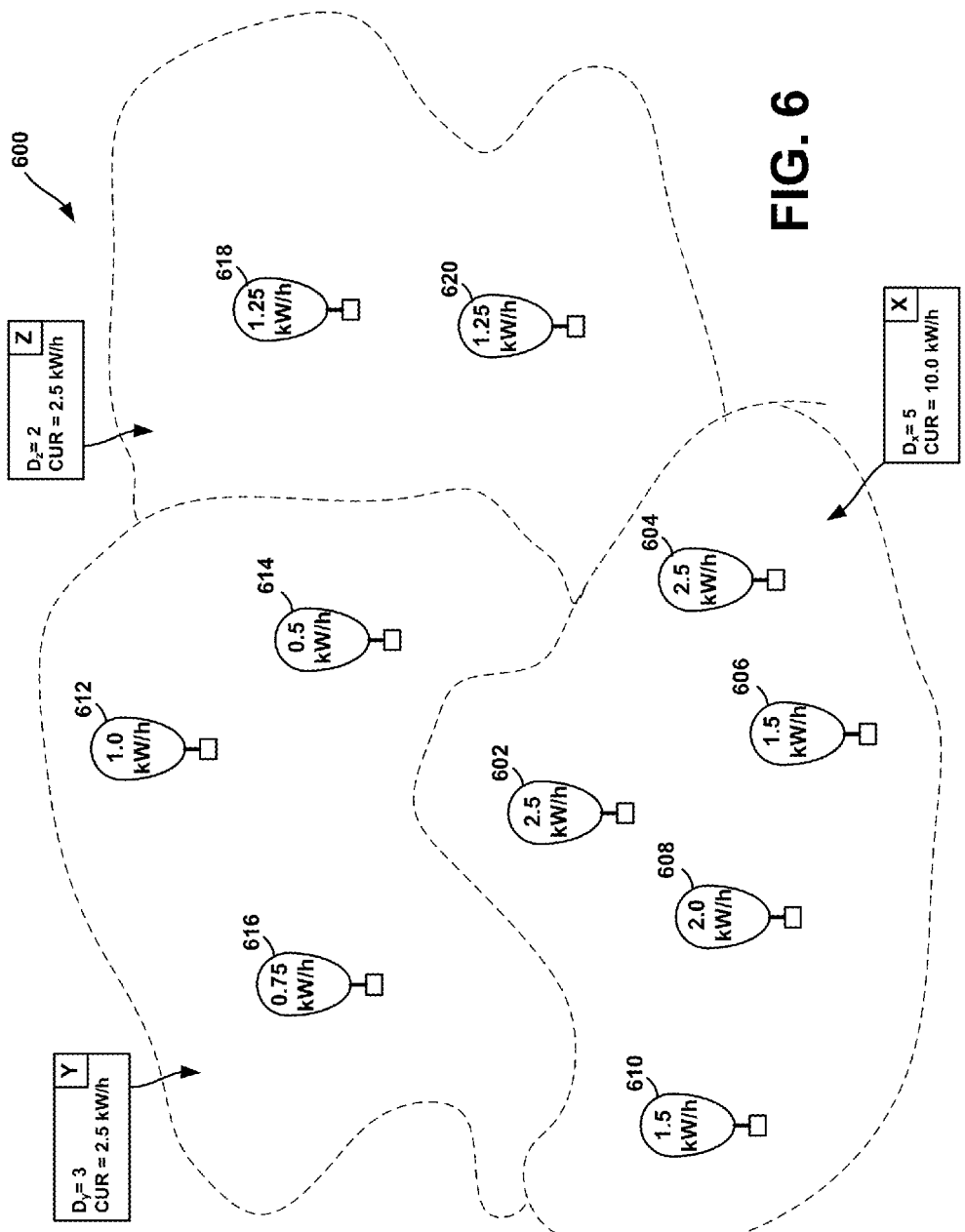
FIG. 6 shows a portion of balloon network in which an example system may be implemented.

FIG. 6 shows a portion of balloon network 600 in which an example system may be implemented. Three geographic zones A, B and C are shown in the illustrated portion of network 600. As further shown, the example system includes a number of balloons 602 to 620, which are operable as nodes in the balloon network. In the illustrated scenario, balloons 602 to 610 are located in geographic zone A, balloons 612 to 616 are located in geographic zone B, and balloons 618 and 620 are located in geographic zone C.

With reference to FIG. 6, an example implementation will now be described in which balloons virtually pool their local power. However, it should be understood that the described features and concepts can also apply to implementations that involve local resources other than power.

In the illustrated scenario, each balloon has a sustainable utilization rate of 1.5 kW/h. (Note, however, that embodiments where balloons have different sustainable utilization rates are also possible.) Further, the network topology in the illustrated portion of the balloon network 600 is such that five balloons provide service in geographic zone X, three balloons provide service in geographic zone Y, and two balloons provide service in geographic zone Z. In particular, density parameters $D_x$, $D_y$, and $D_z$, for geographic zone X, Y, and Z, respectively, may be set to five, three, and two, respectively. As a result, the combined sustainable utilization rates for power in geographic zones X, Y, and Z are 7.5 kW/h, 4.5 kW/h, and 3.0 kW/h, respectively.

However, balloons 602 to 620 virtually pool power in order to collectively provide service in geographic zone X at a combined utilization rate that is greater than the combined sustainable utilization rate of the balloons operating in geographic zone X. In particular, the combined utilization rate (CUR) that is defined for geographic zone X is 10 kW/h, which is greater than the combined sustainable utilization rate of 7.5 kW/h. In the illustrated scenario, balloon 602 is utilizing power at 2.5 kW/h, balloon 604 is utilizing power at 2.5 kW/h, balloon 606 is utilizing power at 1.5 kW/h, balloon 608 is utilizing power at 2.0 kW/h, and balloon 610 is utilizing power at 1.5 kW/h, for a combined utilization rate of 10 kW/h in geographic zone X.

In balloon network 600, over-utilization of power in geographic zone X may be compensated for by under-utilization of power in geographic zone Y, geographic zone Z, and/or in other geographic zones that are not illustrated in FIG. 6. In particular, the respectively defined combined utilization rate for both geographic zone Y and Z is 2.5 kW/h, which is greater than the respective combined sustainable utilization rates of 4.5 kW/h and 3 kW/h. Thus, some or all of the balloons that operate in geographic zone Y and/or geographic zone Z at a given point in time may compensate for previous over-utilization by operating at less than their respective sustainable utilization rate and recharging their local power source.

For instance, in the illustrated scenario, some or all of balloons 612 to 620 may have previously over-utilized power while operating in geographic zone X and/or in other geographic zones that are not shown in FIG. 6. In particular, balloons 612 to 616 may be recharging while operating at individual utilization rates of 1.0 kW/h, 0.5 kW/h, and 0.75 kW/h, respectively, to achieve the combined utilization rate of 2.5 kW/h in geographic zone Y. Similarly, balloons 618 and 620 may be recharging while both operating at an individual utilization rate of 1.25 kW/h to achieve the combined utilization rate of 2.5 kW/h in geographic zone Z.

In some embodiments, balloons in a given geographic zone X to Z may coordinate with one another to determine individual operating utilization rates in order to achieve the combined utilization rate for the given geographic zone. In such an embodiment, balloons in a given geographic zone may use various factors to determine how to distribute the combined utilization rate for the geographic zone between the balloons. For example, balloons in the same geographic zone could coordinate to determine their individual utilization rates for power by comparing their respective local power levels (e.g., remaining charge on the balloon's respective power supplies), such that balloons with more-fully charged power supplies operate with higher utilization rates relative to other balloons in the geographic zone with less-fully charged power supplies.

As another example, balloons in a given geographic zone could coordinate to determine their individual utilization rates based on the expected future utilization rates of each balloon. For example, if the planned movement of a first balloon is expected to take it into a geographic zone where it has the ability to recharge, then the first balloon may be assigned a higher utilization rate than a second balloon in the same geographic zone, which is expected to move into a geographic zone where the second balloon has a lesser ability to re-charge and/or where the second balloon may be required to over-utilize power. Other examples are also possible. Further, factors such as the current power level of balloons relative to one another, the expected future utilization rates of balloons relative to one another, and/or other factors, may be considered alone or in various combinations.

5. Individual Balloon Functionality for Virtual Local-Resource Pooling

Example functions of individual balloons to facilitate virtual pooling of local resources will now be described. The functionality described below may be implemented by a balloon that is configured to operate in a balloon network, such as the balloon described above in reference to FIG. 3. In particular, each balloon may include a non-transitory computer readable medium, such as memory 314, which may include program instructions stored thereon that are executable by at least one processor, such as processor 312. The program instructions may be executable to cause the balloon, or systems thereof, to carry out the functions described herein.

For example, an example balloon may be configured to determine a utilization rate for the local resource for use while the balloon is operating in a particular geographic zone. Accordingly, the balloon may update its utilization rate according to the geographic zone in which it is located.

Further, in some geographic zones the balloon may determine that it should operate at a utilization rate for a local resource that is greater than the balloon's pre-defined sustainable utilization rate for the local resource. Accordingly, the balloon may also determine a path of movement through the geographic zones in the balloon network such that over-utilization of the local resource while located in one geographic zone is substantially offset by under-utilization of the local resource while the balloon is located in one or more other geographic zones.

In order to determine its utilization rate for a local resource, a balloon may coordinate with other balloons in the geographic zone in which the balloon is located. In some embodiments, this may involve the balloon communicating with one or more other balloons in its geographic zone to ascertain the defined utilization rate for the geographic zone (e.g., the utilization rate that should be used by all balloons in the geographic zone). In some implementations, the balloon may search for and receive a broadcast message from one or more other balloons that includes an indication of the defined utilization rate for the geographic zone in which it is located. In other implementations, the balloon may receive a message indicating the defined utilization rate for the geographic zone in response to a specific request that the balloon sends to one or more other balloons.

In a further aspect, once a balloon determines the defined utilization rate for the geographic zone in which it is located, she balloon may transmit or broadcast messages that include an indication of the defined utilization rate, in order to inform other balloons of the defined utilization rate.

In other embodiments, a balloon may communicate with one or more other balloons in its geographic zone to ascertain the combined utilization rate for the geographic zone (e.g., the sum of the balloons' individual utilization rates that should be achieved in the geographic zone). Further, the balloon may determine the current individual utilization rates of one or more other balloons in its geographic zone, in order to determine what its utilization rate should be. For example, if a balloon determines that the combined utilization rate for power in its geographic zone is 5 kW/h, and that the sum of the other balloons' individual utilization rates is 4 kW/h, then the balloon may determine that its utilization rate should be 1 kW/h.

In some implementations, balloons may receive and/or communicate additional information, which may allow for more sophisticated coordination to achieve the combined utilization rate for the geographic zone. For example, a balloon may receive information such as the respective local power levels for other balloons in the geographic zone and/or expected future utilization rates of other balloons in the geographic zone, among other possible information. Further, a balloon may determine and communicate information to other balloons, such as the balloon's own local power level and/or the balloon's own expected future utilization rate of power (or another local resource). Provided with such information, a balloon may evaluate its own current power level relative to other balloons in the geographic zone, its own expected future utilization rate relative to other balloons in the geographic zone, and/or other relative factors. The balloon may then determine what its contribution to the combined utilization rate should be based on its indicators of its own local-resource availability relative to other balloons in the same geographic zone.

In a further aspect, example balloon systems may be configured to create a virtual pool for local resources other than power, and possibly create multiple virtual pools for multiple local resources concurrently.

For instance, a balloon may be configured to pump air or another gas into a container so that the gas in the container is of higher density. The gas in the container may therefor function as ballast. The balloon may decrease its buoyancy by pumping air into the container, and may increase its buoyancy by opening a valve and releasing air from the container.

Accordingly, such air ballast may be considered a local resource. In particular, balloons may be configured to cyclically exhaust and restore their air ballast reserves. For example, because pumping gas into the container may utilize significant power, balloons may pump ballast (e.g., gas) into the container during the day when there is more available solar power to do so and dump ballast at night. Further, operating at a lower altitude may be desirable in some geographic zones (e.g., to catch certain winds, to be closer to the users being serviced, etc.), but there may be other zones where balloons need to go up (e.g. to catch winds heading in a different direction). Thus, operating at a lower altitude may be a scarce "resource" during the night since there may be inadequate power to generate the amount of ballast (by pumping gas into the container) to lower to and/or remain at a desired altitude. As such, some balloons may over-consume power to generate and store ballast during the day, while others may under-consume power and so that more power may be available at night to generate ballast.

In a further aspect, allocation of memory for, e.g., a buffer, may be considered a local resource. In particular, a balloon may be configured to buffer data that it is relaying to other balloons and/or ground-based stations in its physical memory. Accordingly, the sustainable rate at which it can add data to the buffer may be set equal to the rate at which the balloon can transmit data to the other balloons and/or ground-based stations (and thus the rate at which it can clear data from the buffer). Thus, a balloon may over-consume memory for its buffer when, for some period of time, the balloon receives and buffers data at a higher rate than it can transmit the data to the appropriate entities. When this happens, the utilization rate of memory for the buffer is greater than the sustainable utilization rate, so the balloon will fill up its physical memory with buffered data. According, balloons in one geographic zone may, for various reasons, over-utilize memory in order to buffer data at greater than the sustainable utilization rate. Such balloons may then move into another geographic zone where they buffer data at less than the sustainable rate, such that they can transmit data draw down the usage of physical memory buffer, possibly until it the buffer is empty.

6. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
a plurality of balloons that operate as nodes in a balloon network, wherein the balloon network comprises a plurality of geographic zones, and wherein the geographic zones comprise at least a first and a second geographic zone;
wherein each of the balloons has a sustainable utilization rate for a local resource;
wherein each balloon utilizes the local resource according to a respective first utilization rate when located in the first geographic zone and utilizes the local resource according to a second utilization rate when located in the second geographic zone, and wherein, for one or more of the balloons, the sustainable utilization rate is less than the respective first utilization rate and greater than the respective second utilization rate; and
wherein the plurality of balloons are configured to move between the geographic zones of the balloon network such that the first utilization rate is substantially continuous in the first geographic zone.

2. The system of claim 1, wherein the local resource of each balloon has available power that is available from a power supply of the balloon.

3. The system of claim 2, wherein each balloon over-utilizes power when located in the first geographic area by increasing transmission power when located in the first geographic area.

4. The system of claim 2, wherein each balloon over-utilizes power when located in the first geographic area by increasing power utilized by one or more components or systems of the balloon.

5. The system of claim 1, wherein one or more of the balloons are operable to send a message to one or more other balloons that indicates that the first utilization rate should be implemented when located in the first geographic zone.

6. The system of claim 1, wherein a balloon-density parameter specifies a number of balloons that should be located in the first geographic area at any given point in time, and wherein the plurality of balloons are operable to move between the geographic zones of the balloon network such that the specified number of balloons are located in the first geographic area on a substantially continuous basis, and such that the first utilization rate is substantially continuous in the first geographic zone.

7. A balloon system comprising:
a network interface operable to facilitate communication between a balloon and one or more other nodes in a balloon network, wherein the balloon network comprises a plurality of geographic zones, and wherein a utilization rate for a local resource is defined for each geographic zone; and
a non-transitory computer readable medium;
program instructions stored on the non-transitory computer readable medium and executable by at least one processor to:
while the balloon operates in a first geographic zone, cause the balloon to utilize the local resource according to the defined utilization rate for the first geographic zone, wherein the balloon has a sustainable utilization rate for the local resource, and wherein the defined utilization rate for the first geographic zone is greater than the sustainable utilization rate; and determine a path of movement through a plurality of the geographic zones, wherein the path is such that over-utilization of the local resource while the balloon is located in the first geographic zone is substantially offset by under-utilization of the local resource while the balloon is located in one or more of the geographic zones.

8. The balloon system of claim 7, wherein the local resource comprises power from available a power supply of the balloon.

9. The balloon system of claim 7, further comprising program instructions stored on the non-transitory computer readable medium and executable by at least one processor to:

receive a message that indicates the defined utilization rate for the geographic zone in which the balloon is located at a given point in time.

10. The balloon system of claim 7, further comprising program instructions stored on the non-transitory computer readable medium and executable by at least one processor to:

send a message to one or more other balloons that indicates the defined utilization rate for the geographic zone in which the balloon is located at a given point in time.

11. A system comprising:

a plurality of balloons that operate as nodes in a balloon network, wherein the balloon network comprises a plurality of geographic zones, wherein each of the plurality of balloons has a sustainable utilization rate for a local resource, and wherein an operating utilization rate of each balloon is an actual rate at which the balloon is utilizing the local resource at a given point in time;

wherein each balloon is configured to adjust its respective operating utilization rates such that, at a given point in time, a combined utilization rate for the local resource in a first geographic zone is substantially equal to a first predefined combined utilization rate, wherein the first predefined combined utilization rate is greater than the combined sustainable utilization rate in the first geographic zone;

wherein the plurality balloons are further configured to adjust their respective operating utilization rates such that, at a given point in time, a combined utilization rate for the local resource in a second geographic zone is substantially equal to a second predefined combined utilization rate, wherein the second predefined combined utilization rate is greater than a combined sustainable utilization rate in the second geographic zone; and wherein the plurality of balloons are further configured to move between the plurality of geographic zones of the balloon network such that the first predefined combined utilization rate is substantially continuous in the first geographic zone.

12. The system of claim 11, wherein the local resource of each balloon comprises power available from a power supply of the balloon.

13. The system of claim 11, wherein the plurality of geographic zones comprises: (a) one or more over-utilization zones including, wherein the first geographic zone is one of the over-utilization zones and (b) one or more under-utilization zones, wherein the second geographic zone is one of the under-utilization zones.

14. The system of claim 13, wherein the plurality of balloons are configured to move between the geographic zones such that one or more of the balloons offset over-utilization of the local resource while located in the first geographic zone with under-utilization of the local resource while located in one or more of the under-utilization zones, and such that the combined utilization rate is substantially continuous in the first geographic zone.

15. The system of claim 11, wherein a combined sustainable utilization rate for the local resource in each geographic zone is equal to the sum of the sustainable utilization rates of the balloons that are operating in the geographic zone at a given point in time.

16. The system of claim 11, wherein a combined utilization rate for the local resource in each geographic zone is equal to the sum of the operating utilization rates of the balloons that are operating in the geographic zone at a given point in time.

17. The system of claim 16, wherein one or more of the balloons are configured to communicate with one another to determine the respective operating utilization rates of the balloons in the first geographic zone, such that the combined utilization rate for the first geographic zone is equal to the first predefined combined utilization rate on a substantially continual basis.

18. The system of claim 17, wherein the operating utilization rate of at least one of the balloons is determined based on an amount of available power at the balloon relative to an amount of available power at each or one or more other balloons.

19. The system of claim 17, wherein the operating utilization rate of at least one of the balloons is determined based on an expected future utilization rate of the balloon relative to an expected future utilization rate of each or one or more other balloons.

20. The system of claim 11, wherein each of one or more of the balloons are configured to receive, from a ground-based station, a message that indicates an operating utilization rate for the balloon.

* * * * *